Oct. 12, 1948.　　　H. C. NIES　　　2,451,172
CUSHION TIRE
Filed June 14, 1946

Inventor
Hans C. Nies
Attorney

Patented Oct. 12, 1948

2,451,172

UNITED STATES PATENT OFFICE 2,451,172

CUSHION TIRE

Hans C. Nies, Passaic, N. J.

Application June 14, 1946, Serial No. 676,793

3 Claims. (Cl. 152—310)

The present invention relates to a tire for any kind of vehicle and is more particularly concerned with a cushion tire as contra-distinguished from pneumatic tires.

The primary object of the invention is to provide resiliency without using pneumatic inner tubes, liquid filled containers, or springs.

Another object of the invention is to provide a tire which is proof against flats and blow-outs, does not require refilling with air under pressure, and obviates the necessity of spares.

A further object of the invention is to provide a tire of the character referred to which is simple and can be manufactured with little expense.

Still another object of the invention is to provide a tire of the character referred to of simpler and more compact construction than prior devices.

With the foregoing and other objects and advantages in view the invention consists of the novel construction and arrangement of parts hereinafter described and claimed.

Figure 1:
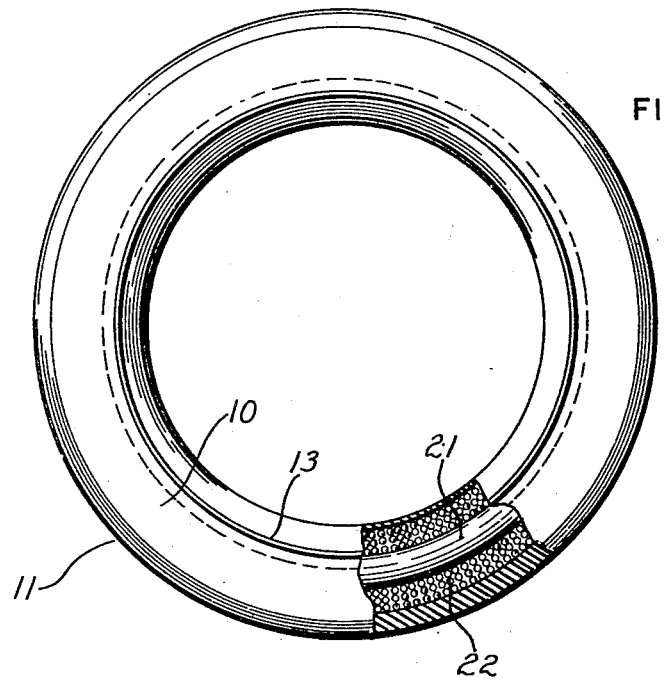
Figure 2:
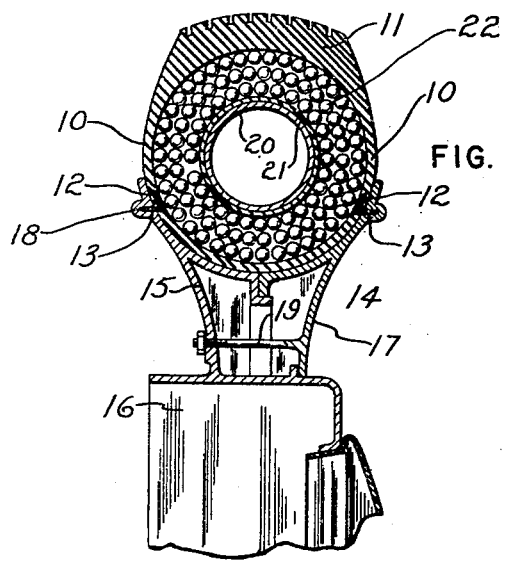

In the accompanying drawings illustrating the preferred embodiment of the invention, Figure 1 is a side elevation of the tire with a part in section to show the interior construction, and Figure 2 is a transverse section of the tire mounted on the rim of a motor vehicle wheel.

Like numerals, as used in the description and drawings, designate the same structural parts.

10 is the rubber casing, substantially of conventional form and 11 the tread thereof. In the process of manufacture a metal annulus 12 is embedded in each side wall in coaxal position and each annulus is provided with an annular flange 13 which projects outwardly from the tire. This annular flange is designed to engage a demountable rim 14 comprising two sections, an inner one 15 which, preferably, is constructed integral with the brake drum 16, and an outer one 17. Both, of course, are circular in form and designed to be coaxial with the wheel.

Each is provided interiorly with an annular groove 18 positioned to engage the annular flange 13. The two sections are fastened together on the tire by means of bolts 19 projecting transversely from the inner wall of rim section 17, with which they are preferably integral, and secured by nuts.

The tire comprises the rubber member 10 with tread, heretofore described, and a tubular metallic relatively rigid core member 20 which is preferably coated with a layer of rubber 21. This interior core member is of less diameter than the inner wall of member 10 and the two members are spaced apart uniformly to admit a filling of hard rubber balls 22 of suitable diameter and in close contact. However, resilient units of plastic or other suitable material may be substituted for the rubber balls.

Said balls are vulcanized to each other and to the adjacent inner surface of the member 10, also to the rubber coating on core member 20, thus providing a cohesive and resilient element between members 10 and 20 which increases the magnitude of deflection and resists the forces of the supported load by stress in the elements aforesaid.

This construction will support the tire tread and obviate excessive generation of heat, which is common in tires that rely on the flexing of resilient elements in compression and/or bending to produce the desired cushion effect.

This tire will afford superior cushioning and attain increased life at low cost.

As different embodiments may be made of this inventive concept and modifications may be made in the embodiment hereinbefore shown and described, it will be understood that the matter herein is to be interpreted as illustrative merely, and not in a limiting sense except as set forth in the appended claims.

What I claim is:

1. A cushion tire for vehicles comprising an annular rubber casing of tubular construction, an annular metallic core of tubular construction uniformly spaced from the inner surface of the casing, a coating of rubber surrounding said core, a plurality of hard rubber balls filling the space between said core and the wall of the casing, said balls being vulcanized together and to the core and to said wall to form a cohesive unit.

2. A cushion tire for vehicles comprising in combination, a tubular casing, a metallic tubular core within said casing and substantially uniformly spaced from the inner surface thereof, a plurality of spheroids filling said space between said core and casing, and vulcanizing means binding said spheroids together as well as to said core and casing in order to form a cohesive unit.

3. A cushion tire for vehicles comprising in combination, a tubular casing, a metallic tubular core within said casing and substantially uniformly spaced from the inner surface thereof, a plurality of spheroids filling the space between said core and wall of the casing, a coating of resilient material surrounding said core, and resilient means binding said spheriods in said core and said casing together in order to form a cohesive unit.

HANS C. NIES.

REFERENCES CITED

The following references are of record in the file of this patent:

UNITED STATES PATENTS

| Number | Name | Date |
|---|---|---|
| 678,055 | Southwick | July 9, 1901 |
| 849,062 | Gauld | Apr. 2, 1907 |
| 865,411 | Marien | Sept. 10, 1907 |
| 1,260,155 | Deatrich | Mar. 19, 1918 |
| 1,310,113 | Culmer | July 15, 1919 |
| 1,415,140 | Beckman | May 9, 1922 |

FOREIGN PATENTS

| Number | Country | Date |
|---|---|---|
| 189,546 | Switzerland | 1937 |